United States Patent
Yang et al.

(10) Patent No.: US 9,459,803 B1
(45) Date of Patent: Oct. 4, 2016

(54) CLONING VIRTUAL MACHINES

(71) Applicant: VMware, Inc., Palo Alto, CA (US)

(72) Inventors: Ji Yang, Beijing (CN); Yonghua Lin, Beijing (CN); Xiaoding Bian, Beijing (CN)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 14/681,111

(22) Filed: Apr. 8, 2015

(51) Int. Cl.
*G06F 3/06* (2006.01)
*G06F 9/455* (2006.01)

(52) U.S. Cl.
CPC ............ *G06F 3/0619* (2013.01); *G06F 3/065* (2013.01); *G06F 3/0665* (2013.01); *G06F 3/0689* (2013.01); *G06F 9/45558* (2013.01); *G06F 2009/45562* (2013.01)

(58) Field of Classification Search
None
See application file for complete search history.

(56) References Cited

U.S. PATENT DOCUMENTS

| 9,003,392 B2* | 4/2015 | Arcese | G06F 9/455 717/168 |
| 2011/0154331 A1* | 6/2011 | Ciano | G06F 9/45558 718/1 |
| 2013/0152080 A1* | 6/2013 | Sachindran | G06F 9/44526 718/1 |
| 2014/0259014 A1* | 9/2014 | Watanabe | G06F 9/5077 718/1 |

* cited by examiner

*Primary Examiner* — Kevin Verbrugge (57) ABSTRACT

A virtual machine system clones a parent virtual machine on a host by creating an open virtualization format (OVF) package of the parent virtual machine, creating a metainfo file of the OVF package, sending the metainfo file to a tracker, and cloning the parent virtual machine to other hosts by accessing the tracker to determine pieces of the OVF packages are located on the host and any of the other hosts, downloading the pieces of the OVF packages to the other hosts, assembling the OVF package on the other hosts, and deploying full clones of the parent virtual machine on the other hosts from the assembled OVF package.

20 Claims, 6 Drawing Sheets

CLONING VIRTUAL MACHINES

BACKGROUND

Apache Hadoop is a popular application for big data storage and processing. However, deployment and management complexities in a physical environment prevent many enterprises from using Hadoop. Virtualizing Hadoop overcomes such difficulties by providing rapid deployment and easy management.

Cloning may be used to deploy virtual machines implementing Hadoop clusters. A clone is a copy of an existing virtual machine (VM). There are two types of clone: a full clone and a linked clone. A full clone is an independent copy of a parent VM that shares nothing with the parent after the cloning operation. A linked clone is a copy of a parent VM that stores differences between the cloned VM and the parent VM in a delta virtual machine disk. Any data not in the delta disk is looked up from the virtual machine disk of the parent VM.

For good performance and reliability, full clones distributed across different hosts are used for Hadoop clusters. Unfortunately traditional cloning is a one-to-one process. A Hadoop cluster including hundreds or thousands of VMs would take a very long time to create. For example, cloning 150 VMs would take more than 24 hours.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated herein.

In accordance with examples of the present disclosure, a parent virtual machine (VM) on a host is rapidly and fully cloned to other hosts using peer-to-peer (P2P) file sharing. Under the control of a VM manager, the host creates an open virtualization format (OVF) package of the parent VM and then shares the OVF package with other hosts through a P2P sharing protocol. Using the P2P sharing protocol, the other hosts download pieces of the OVF package from the host and each other, assemble the OVF package from the downloaded pieces, and deploy full clones of the parent VM from the assembled OVF package. Experiments show that it takes less than 10 minutes to clone and deploy 150 VMs whereas the traditional cloning method takes more than 24 hours.

Figure 1:
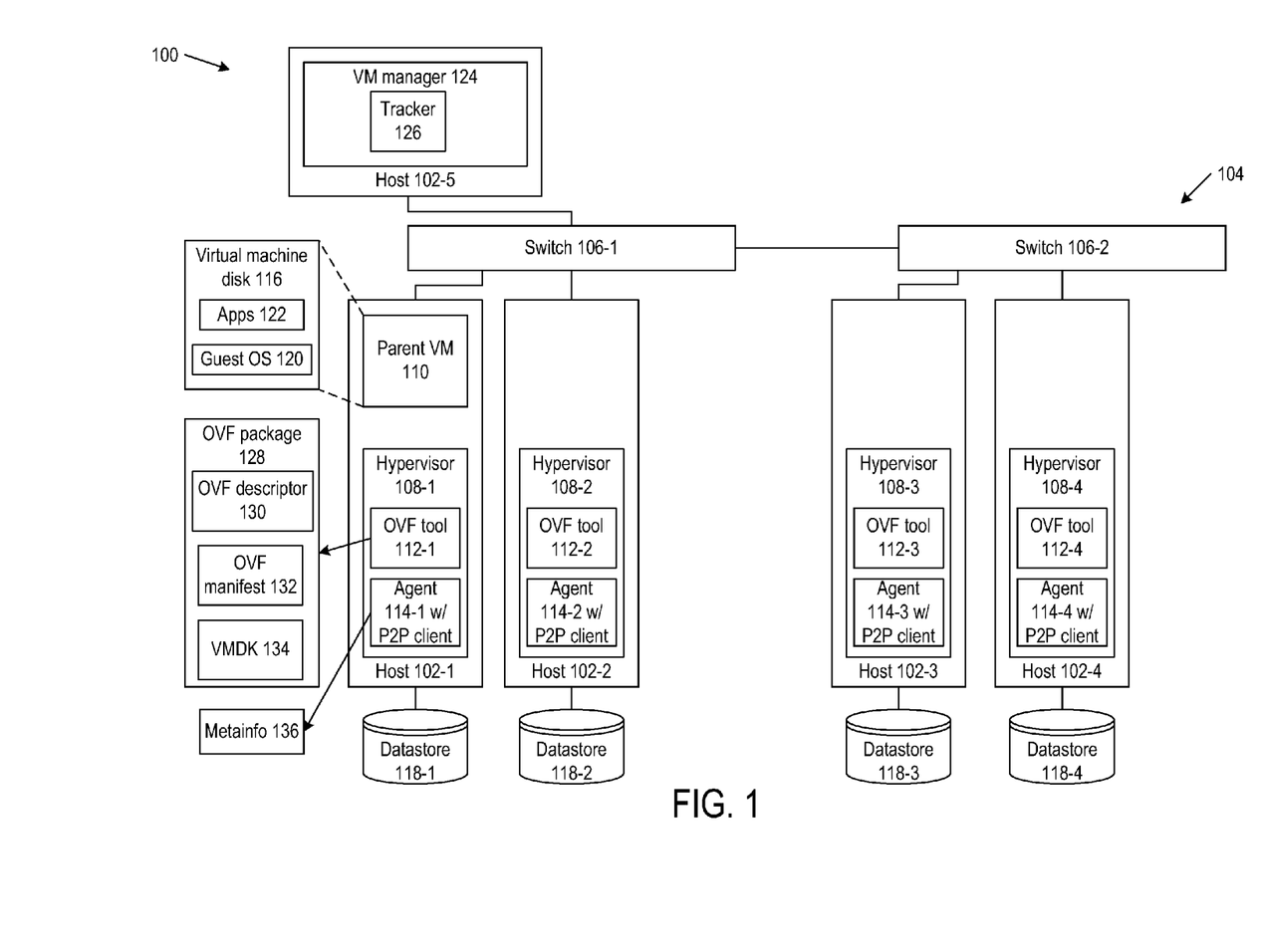
FIG. 1 is a block diagram illustrating a simplified view of a virtual machine (VM) system in examples of the present disclosure.

FIG. 1 is a block diagram illustrating a simplified view of a VM system 100 in examples of the present disclosure. System 100 includes hosts 102-1, 102-2, 102-3, 102-4, and 102-5 interconnected by a network 104. A host is a physical computer that uses virtualization software to run VMs, and a VM is a software computer that runs a guest operating system (OS) and applications. Network 104 may include interconnected switches 106-1 and 106-2.

Host 102-1 has hardware that executes a hypervisor 108-1, such as a VMware® vSphere® Hypervisor, to support a parent VM 110 that is to be cloned. A hypervisor is a platform that allows VMs with different guest OS's to run on a host at the same time. Hypervisor 108-1 includes an OVF tool 112-1 and a cloning agent 114-1. Alternatively OVF tool 112-1 and cloning agent 114-1 are independent from hypervisor 108-1. OVF is an open standard for packaging and distributing software to be run in virtual systems. Cloning agent 114-1 includes a client for a P2P file sharing protocol ("P2P client"). Alternatively the P2P agent may be independent from cloning agent 114-1. P2P file sharing is the distribution and sharing of a file using P2P networking technology. In the P2P file sharing protocol, host 102-1 is a seeder that sends out pieces of a file to peers that are missing the pieces.

Parent VM 110 is stored as a virtual machine disk (vmdk) 116 on a datastore 118-1 of host 102-1. A virtual machine disk is a file or a set of files that appears as a physical disk drive to a guest OS that runs inside a VM, and a datastore is a virtual representation of combinations of underlying physical storage resources, such as a host's local physical disk. Virtual machine disk 116 includes a guest OS 120 and one or more applications 122.

Hosts 102-2, 102-3, and 102-4 have hardware that execute hypervisors 108-2, 108-3, and 108-4, respectively. Hypervisors 108-2, 108-3, and 108-4 include respective OVF tools 112-2, 112-3, 112-4 and respective cloning agents 114-2, 114-3, and 114-4. Alternatively OVF tools 112-2, 112-3, 112-4 and cloning agents 114-2, 114-3, 114-4 are independent from their respective hypervisors 108-2, 108-3, 108-4. Cloning agents 114-2, 114-3, and 114-4 include respective P2P clients. Alternatively the P2P agents may be independent from their respective cloning agents 114-2, 114-3, and 114-4. In the P2P file sharing protocol, hosts 102-2, 102-3, and 102-4 are the peers that do not have all the pieces of a file but may become seeders once they collected all the pieces.

Host 102-5 has hardware that executes a VM manager 124, such as a VMware® vCenter Server™. Alternatively VM manager 124 may be located at one of hosts 102-1, 102-2, 102-3, and 102-4. A VM manager is software that provides local or remote user access to centrally provision and manage VMs. VM manager 124 includes a tracker 126 for the P2P sharing protocol. Alternatively tracker 126 may be independent from VM manager 124. Tracker 126 keeps track of all seeders and peers, and the peers report to the tracker periodically to receive information from other peers and the seeders.

VM manager 124 includes a fast full cloning function that leverages the P2P sharing protocol. The fast full cloning function allows a parent VM to be rapidly and fully cloned to hundreds or even thousands of hosts. A user first accesses VM manager 124 to identify a parent VM to clone, hosts onto which the parent VM is to be cloned, and datastores of the hosts where full clones are to be stored. To demonstrate the fast full cloning function, consider a simplified scenario where the user wishes to fully clone parent VM 110 of host 102-1 to hosts 102-2, 102-3, and 102-4 and save the clones in their respective datastores 118-2, 118-3, and 118-4.

A full clone of a parent VM may be created with a copy of the parent VM's virtual machine disk and a description of the parent VM's virtual hardware. In some examples of the present disclosure, an OVF package is used to capture this information. For convenience, the OVF package may be saved as an open virtual appliance (OVA) file, which is a single archive file in the Tape Archive (TAR) format with all the files in the OVF package.

VM manager 124 first instructs or otherwise causes agent 114-1 on host 102-1 to use OVF tool 112-1 to create an OVF package 128 of parent VM 110 and save the OVF package as an OVA file on datastore 118-1. OVF package 128 includes an OVF descriptor 130, an OVF manifest 132, and a copy 134 of virtual machine disk 116. OVF descriptor 130 is a file containing virtual hardware requirements of parent VM 110, OVF manifest 132 is an optional file containing an SHA-1 digest of the files in OVF package 128, and copy 134 may be a compressed version of virtual machine disk 116.

VM manager 124 next instructs or otherwise causes agent 114-1 on host 102-1 to use its P2P client to share OVF package 128. Using its P2P client, agent 114-1 splits OVF package 128 into pieces and creates a metainfo file 136 based on the pieces of the OVF package and an address (e.g., a uniform resource locator) of tracker 126. Agent 114-1 then sends metainfo file 136 to tracker 126. Metainfo file 136, such as a torrent file, includes a hash list of all the pieces of OVF package 128, the size of the pieces, and the address of tracker 126.

Note that in examples of the present disclosure where an OVF package is not used, virtual machine disk 116 (or a copy thereof) and the virtual hardware description of parent VM 110 may be separate files and agent 114-1 may individually share each file by splitting the file, creating a metainfo file based on the pieces of the file, and sending the metainfo file to tracker 126.

VM manager 124 then instructs or otherwise causes agents 114-2, 114-3, and 114-4 on respective hosts 102-2, 102-3, and 102-4 to use their P2P clients to download the pieces of OVF package 128. To accomplish this, VM manager 124 may upload metainfo file 136 to agents 114-2, 114-3, and 114-4. Using their P2P clients on metainfo file 136, agents 114-2, 114-3, and 114-4 access tracker 126 and start to download the pieces of OVF package 128 onto respective datastores 118-2, 118-3, and 118-4 of respective hosts 102-2, 102-3, and 102-4. Agents 114-2, 114-3, and 114-4 may request the pieces using various strategies, such as random first piece and rarest first piece. Once an agent on a host completes the download of a piece of OVF package 128 and verifies the piece against the hash list in metainfo file 136, the agent on the host notifies tracker 126 so the agent can upload the piece to other hosts that need the piece.

Note that in examples of the present disclosure where an OVF package is not used, agent 114-1 may upload the metainfo files for the virtual machine disk 116 (or a copy thereof) and the virtual hardware description of parent VM 110 to agents 114-2, 114-3, and 114-4, and the agents may use their P2P clients on the metainfo files to access tracker 126 and download the pieces of the virtual machine disk and the virtual hardware description.

After an agent on a host has downloaded all the pieces, the agent uses its P2P clients to assemble OVF package 128 from the downloaded pieces based metainfo file 136. The agent then uses its OVF tool to import or otherwise deploy a full clone of parent VM 110 based on OVF descriptor 130, OVF manifest 132, and virtual machine disk 134 in OVF package 128.

Note that in examples where an OVF package is not used, the agent would deploy a full clone of parent VM 110 based on virtual machine disk 116 (or a copy thereof) and the virtual hardware description of the parent VM.

Within the host, the agent may create additional clones under the direction of VM manger 124. For example, the agent may create additional full clones on the same or a different datastore of the host. Furthermore, VM manager 124 may instruct or otherwise cause an agent on another host to create a linked clone to the full clone on the host.

Figure 2:
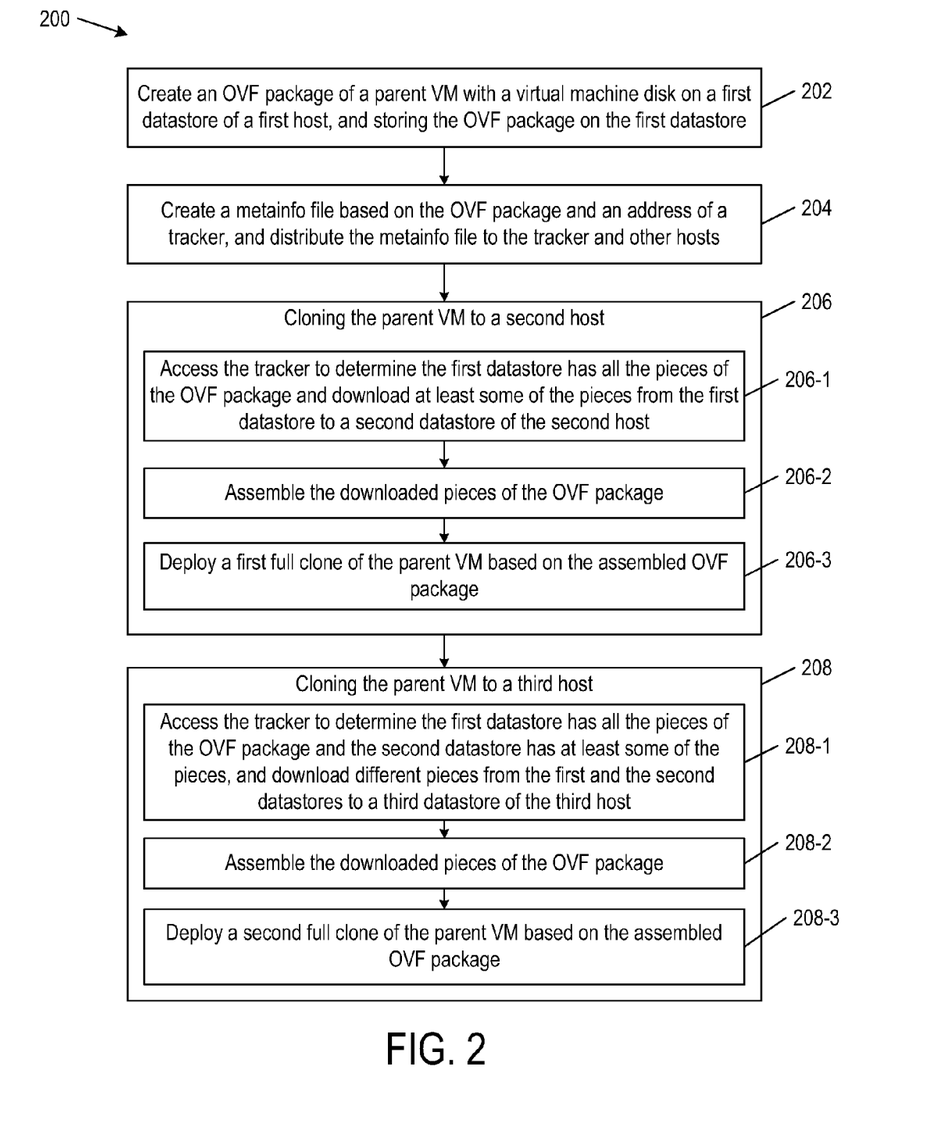
FIG. 2 is a flowchart of a sequence to rapidly and fully clone a parent VM of FIG. 1 in examples of the present disclosures.

FIG. 2 is a flowchart illustrating a sequence 200 where system 100 rapidly and fully clones a parent VM in examples of the present disclosures. Sequence 200 represents a scenario where a user wishes to fully clone parent VM 110 (FIG. 1) on host 102-1 (FIG. 1) to hosts 102-2 and 102-3 (FIG. 1). Sequence 200 may begin in block 202.

In block 202, OVF package 128 (FIG. 1) of parent VM 110 with virtual machine disk 116 (FIG. 1) on datastore 118-1 (FIG. 1) is created and stored on the datastore. As described above, the user first accesses VM manager 124 (FIG. 1) to identify parent VM 110 to clone, hosts 102-2 and 102-3 on which the parent VM is to be cloned, and datastores 118-2 and 118-3 (FIG. 1) of the respective hosts where the full clones are to be stored. VM manager 124 then instructs or otherwise causes agent 114-1 (FIG. 1) on host 102-1 to use OVF tool 112-1 (FIG. 1) to create an OVF package 128 of parent VM 110 and save the OVF package on datastore 118-1. Block 202 may be followed by block 204.

In block 204, metainfo file 136 is created based on OVF package 128 and the address of tracker 126 (FIG. 1), and the metainfo file is distributed to the tracker and hosts 102-2 and 102-3. As described above, VM manager 124 instructs or otherwise causes agent 114-1 on host 102-1 to use its P2P client to create metainfo file 136 and send the metainfo file to tracker 126. VM manager 124 then instructs or otherwise causes agents 114-2 and 114-3 (FIG. 1) on respective hosts 102-2 and 102-3 to use their P2P clients to download the pieces of OVF package 128, such as by uploading metainfo file 136 to the agents.

Note that in examples where an OVF package is not used, virtual machine disk 116 (or a copy thereof) and the virtual hardware description of parent VM 110 may be separate files and agent 114-1 may split each file into pieces, create a metainfo file based on the pieces of each file, and send each metainfo file to tracker 126 and agents 114-2 and 114-3.

Block 204 may be followed by block 206.

In block 206, assume parent VM 110 is first cloned to host 102-2. Block 206 may include blocks 206-1, 206-2, and 206-3.

In block 206-1, agent 114-2 of host 102-2 uses its P2P client to open metainfo file 136, which causes the P2P client to access tracker 126 and determine seeders and peers that have the pieces of OVF package 128. Assume agent 114-2 is the first to reach tracker 126, the tracker informs the agent that all the pieces of OVF package 128 are available from seeder host 102-1. Agent 114-2 then uses its P2P client to download at least some of the pieces of OVF package 128 (e.g., pieces 302) from datastore 118-1 to datastore 118-2 of host 102-2 as illustrated in FIG. 3.

Note that in examples where an OVF package is not used, agent 114-2 would download the pieces of the virtual machine disk 116 (or a copy thereof) and the virtual hardware description of parent VM 110.

Block 206-1 may be followed by block 206-2.

Figure 3:
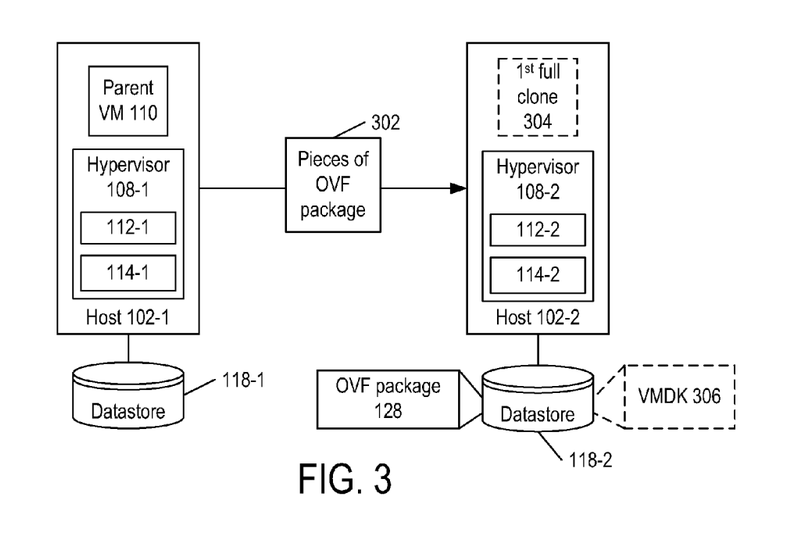
FIGS. 3 and 4 are block diagrams illustrating the sequence of FIG. 2 in examples of the present disclosure.

In block 206-2, agent 114-2 uses its P2P client to assemble the downloaded of OVF package 128 (including pieces 302) based on metainfo file 136 as illustrated in FIG. 3.

Note that in examples where an OVF package is not used, agent 114-2 would assemble virtual machine disk 116 (or a copy thereof) and the virtual hardware description of parent VM 110.

Block 206-2 may be followed by block 206-3.

In block 206-3, agent 114-2 uses OVF tool 112-2 to import or otherwise deploy a full clone 304 on host 102-2 based on the assembled OVF package 128 as illustrated in FIG. 3. As a result full clone 304 has the virtual hardware specified in OVF descriptor 130 (FIG. 1) and a virtual machine disk 306 saved in datastore 118-2.

Note that in examples where an OVF package is not used, agent 114-2 would deploy full clone 304 based on virtual machine disk 116 (or a copy thereof) and the virtual hardware description of parent VM 110.

Block 206 may be followed by block 208. Alternatively part of block 206 may overlap block 208.

In block 208, assume parent VM 110 is next cloned to host 102-3. Block 208 may include blocks 208-1, 208-2, and 208-3.

In block 208-1, agent 114-3 of host 102-3 uses its P2P client to open metainfo file 136, which causes the P2P client to access tracker 126 and determine seeders and peers that have the pieces of OVF package 128. Assume agent 114-3 is the second to reach tracker 126, the tracker informs the agent that all the pieces of OVF package 128 are available from seeder host 102-1 and at least some of the pieces of the OVF package are available from peer host 102-2. Agent 114-3 then uses its P2P client to download different pieces 402 and 404 of OVF package 128 from respective datastores 118-1 and 118-2 of respective hosts 102-1 and 102-2 to datastore 118-3 of host 102-3 as illustrated in FIG. 4.

Note that peer host 102-2 may still be downloading missing pieces of OVF package 128 from seed host 102-1. Further note that peer host 102-2 may also download missing pieces of OVF package 128 that become available on peer host 102-3. Additionally note that in examples where an OVF package is not used, agent 114-3 would download the pieces of the virtual machine disk 116 (or a copy thereof) and the virtual hardware description of parent VM 110.

Block 208-1 may be followed by block 208-2.

Figure 4:
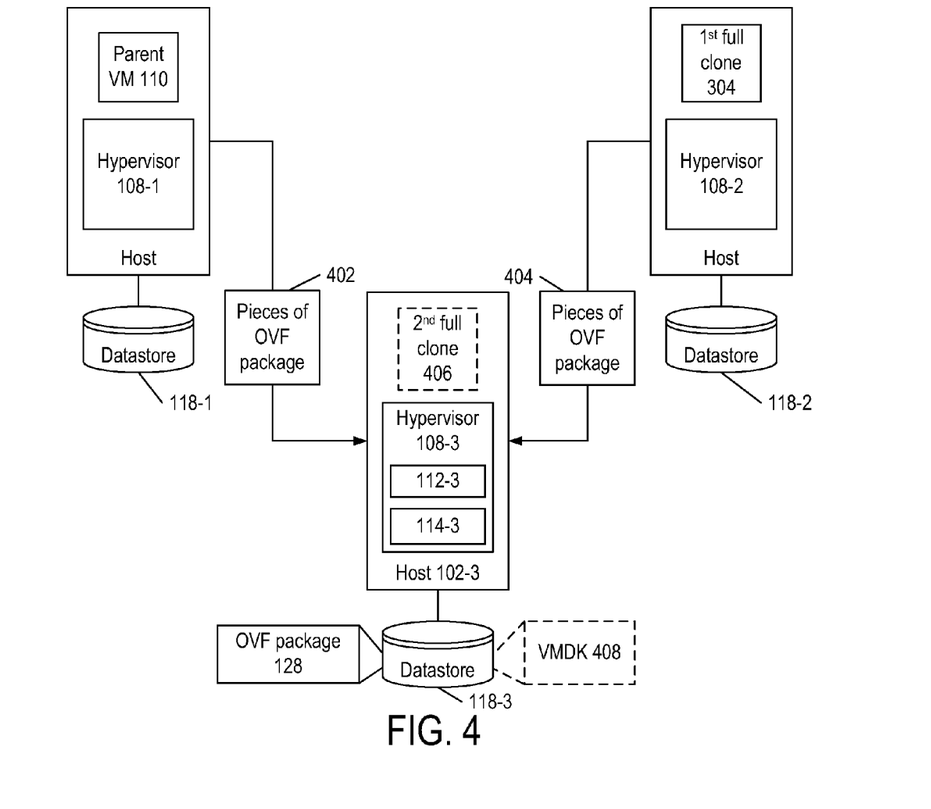

In block 208-2, agent 114-3 uses its P2P client to assemble the downloaded pieces 402 and 404 of OVF package 128 based on metainfo file 136 as illustrated in FIG. 4.

Note that in examples where an OVF package is not used, agent 114-3 would assemble virtual machine disk 116 (or a copy thereof) and the virtual hardware description of parent VM 110.

Block 208-2 may be followed by block 208-3.

In block 208-3, agent 114-3 uses OVF tool 112-3 to import or otherwise deploy a full clone 406 on host 102-3 based on the assembled OVF package 128 as illustrated in FIG. 4. As a result full clone 406 has the virtual hardware specified in OVF descriptor 130 (FIG. 1) and a virtual machine disk 408 saved in datastore 118-3.

Note that in examples where an OVF package is not used, agent 114-3 would deploy full clone 406 based on virtual machine disk 116 (or a copy thereof) and the virtual hardware description of parent VM 110.

Figure 5:
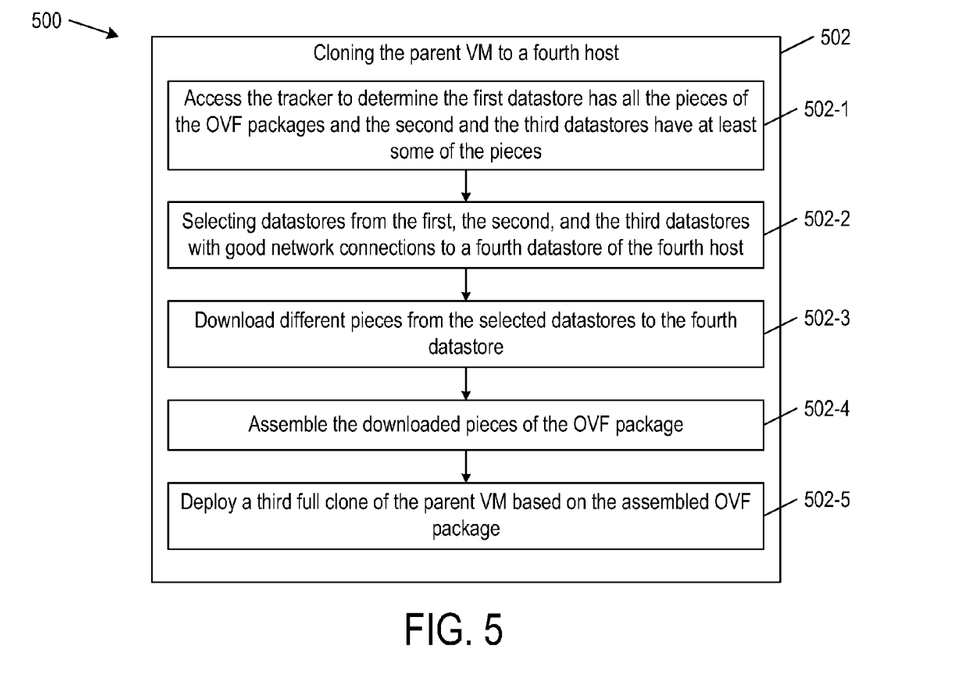
FIG. 5 is a flowchart of a sequence to rapidly and fully clone a parent VM of FIG. 1 in examples of the present disclosures.

FIG. 5 is a flowchart illustrating a sequence 500 where system 100 rapidly and fully clones a parent VM in examples of the present disclosures. Sequence 500 represents a scenario where the user wishes to clone parent VM 110 (FIG. 1) on host 102-1 (FIG. 1) to hosts 102-2, 102-3, and 102-4 (FIG. 1). Sequence 500 may begin in block 502 that follows block 208 (FIG. 2) of sequence 200 (FIG. 2). Alternatively part of block 208 may overlap block 502.

In block 502, parent VM 110 is cloned to host 102-4. Blocks 502 may include blocks 502-1, 502-2, 502-3, 502-4, and 502-5.

In block 502-1, agent 114-4 of host 102-4 uses its P2P client to open metainfo file 136, which causes the P2P client to access tracker 126 and determine seeders and peers that have the pieces of OVF package 128. Assume agent 114-4 is the third to reach tracker 126, the tracker informs the agent that all the pieces of OVF package 128 are available from seeder host 102-1, at least some of the pieces of the OVF package are available from peer host 102-2, and at least some of the pieces of the OVF packages are available from peer host 102-3. Block 502-1 may be followed by block 502-2.

In block 502-2, agent 114-4 detects conditions of the network connections between datastore 118-4 and datastores 118-1, 118-2, 118-3, and selects datastores with good network connections (e.g., connection speeds over a threshold). Assume the network connection is bad between datastores 118-4 and 118-2 so only datastores 118-1 and 118-3 are selected and datastore 118-2 is dropped as shown in FIG. 6.

Note that any datastore that is dropped cannot be the sole source of any piece of OVF package 128. Instead of dropping a datastore, more pieces of OVF package 128 are to be downloaded from datastores 118-1 and 118-3 than datastore 118-2. Further note that agent 114-4 may select datastores based on another criterion or multiple criteria.

Block 502-2 may be followed by block 502-3.

Figure 6:
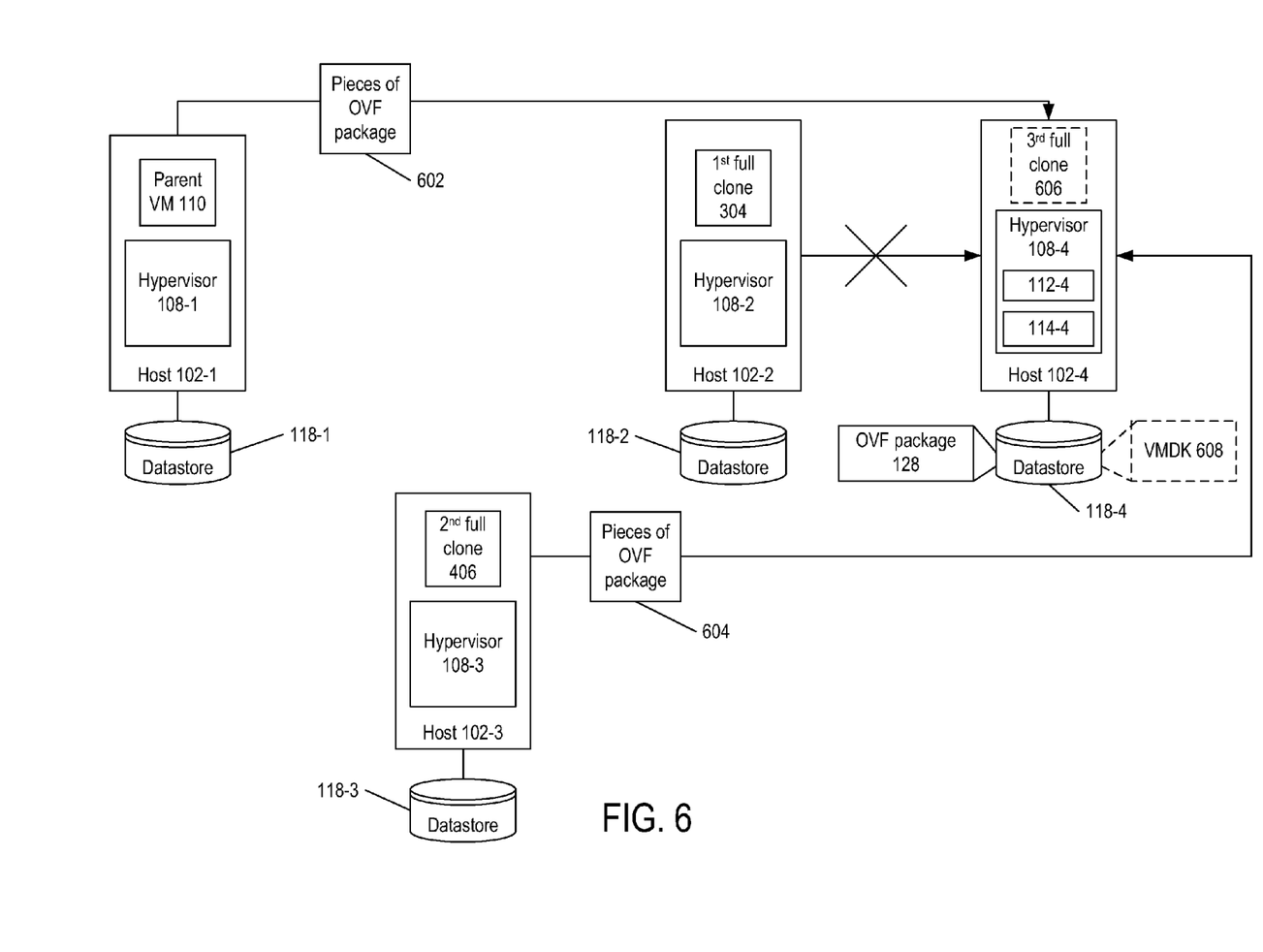
FIG. 6 is block diagram illustrating the sequence of FIG. 5 in examples of the present disclosure.

In block 502-3, agent 114-4 uses its P2P client to download different pieces 602 and 604 of OVF package 128 from respective selected datastores 118-1 and 118-3 of respective hosts 102-1 and 102-3 to datastore 118-4 of host 102-4 as illustrated in FIG. 6.

Note that peer host 102-3 may still be downloading missing pieces of OVF package 128 from seed host 102-1 and peer host 102-2. Additionally note that peer host 102-3 may also download missing pieces of OVF package 128 that become available on peer host 102-4. Further note that in examples where an OVF package is not used, agent 114-4 would download the pieces of the virtual machine disk 116 (or a copy thereof) and the virtual hardware description of parent VM 110.

Block 502-3 may be followed by block 502-4.

In block 502-4, agent 114-4 uses its P2P client to assemble the downloaded pieces 602 and 604 of OVF package 128 based on metainfo file 136 as illustrated in FIG. 6.

Note that blocks similar to blocks 502-2, 502-3, and 502-4 may replace block 208-2 in sequence 200 but was left out for the sake of clarity. Further note that in examples where an OVF package is not used, agent 114-4 would assemble virtual machine disk 116 (or a copy thereof) and the virtual hardware description of parent VM 110.

Block 502-4 may be followed by block 502-5.

In block 502-5, agent 114-4 uses OVF tool 112-4 to import or otherwise deploy a full clone 606 on host 102-4 based on the assembled OVF package 128 as illustrated in FIG. 6. As a result full clone 606 has the virtual hardware specified in OVF descriptor 130 (FIG. 1) and a virtual machine disk 608 stored on datastore 118-4.

Note that in examples where an OVF package is not used, agent 114-4 would deploy full clone 606 based on virtual machine disk 116 (or a copy thereof) and the virtual hardware description of parent VM 110.

Figure 7:
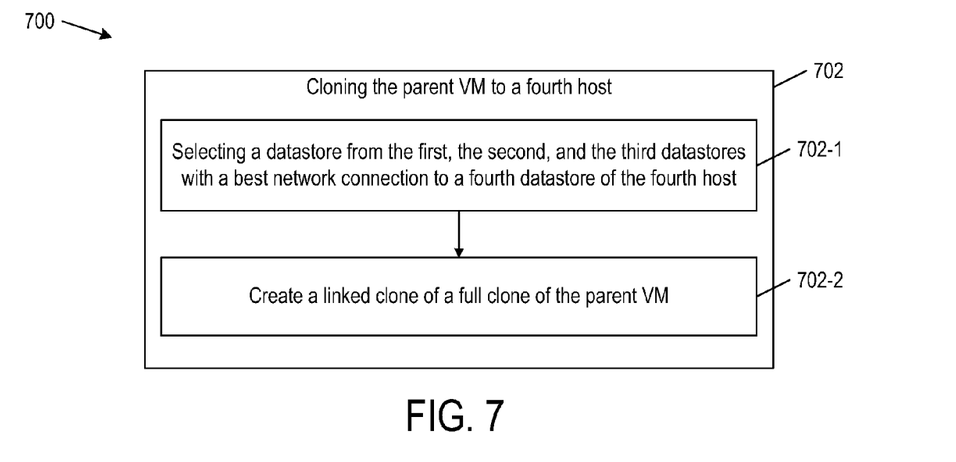
FIG. 7 is a flowchart of a sequence to link clone a parent VM of FIG. 1 in examples of the present disclosures.

FIG. 7 is a flowchart illustrating a sequence 700 where system 100 rapidly clones a parent VM in examples of the present disclosures. Sequence 700 represents a scenario where a user wishes to fully clone parent VM 110 (FIG. 1) on host 102-1 (FIG. 1) to hosts 102-2, 102-3 and link clone the parent VM to host 102-4 (FIG. 1). Sequence 700 may begin in block 702 that follows block 208 (FIG. 2) in sequence 200 (FIG. 2). Alternatively part of block 208 may overlap block 702.

In block 702, parent VM 110 is link cloned to host 102-4. VM manager 124 (FIG. 1) instructs or otherwise causes agent 114-4 (FIG. 1) on host 102-4 to create a linked clone with the virtual hardware specified in OVF descriptor 130 (FIG. 1) or another virtual hardware description file when an OVF package is not used. Blocks 702 may include blocks 702-1 and 702-2.

In block 702-1, agent 114-4 detects the conditions of the network connections between datastore 118-4 and datastores 118-1, 118-2, 118-3, and selects the datastore with the best network connection (e.g., the best connection speed). Assume the network connection is best between datastores 118-4 and 118-2. Block 702-1 may be followed by block 702-2.

Figure 8:
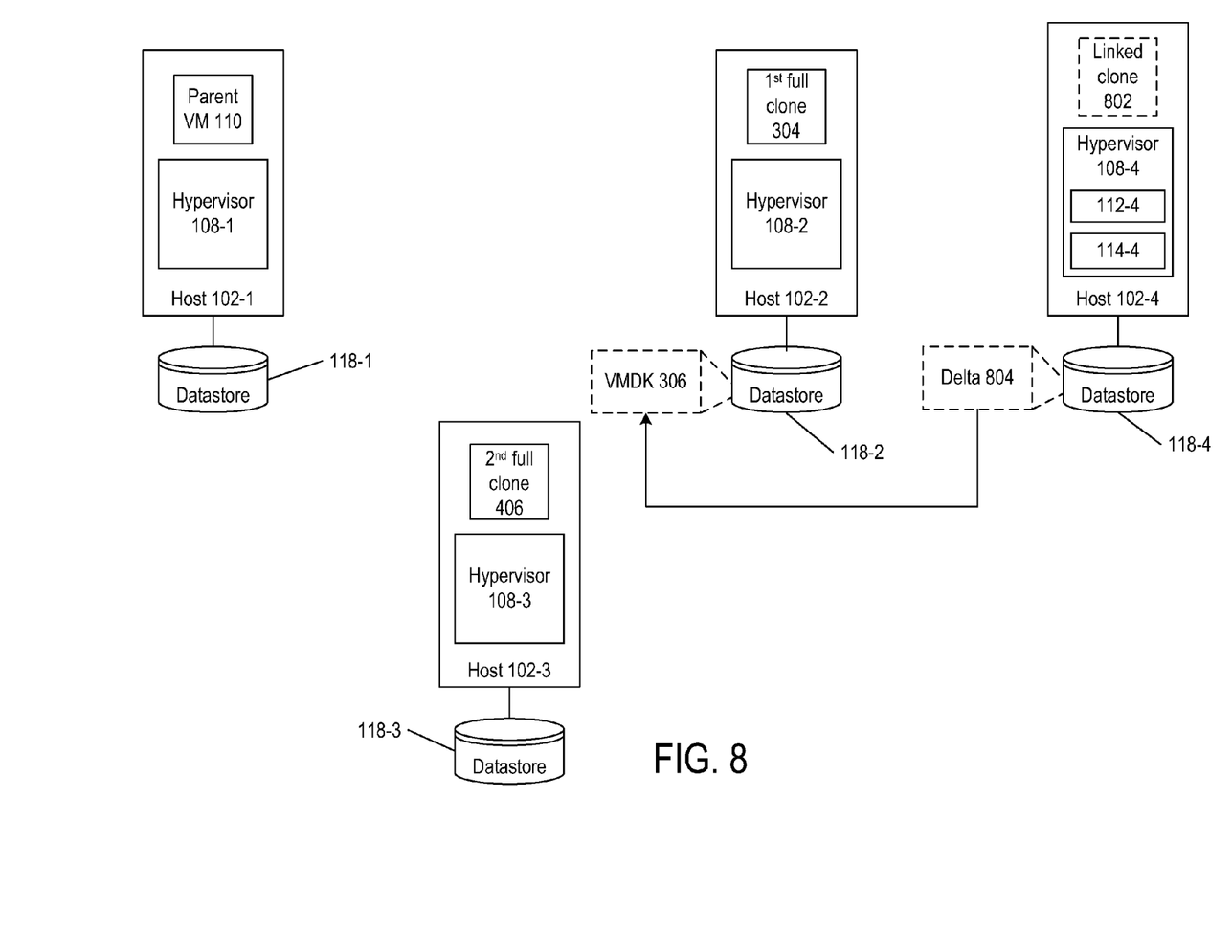
FIG. 8 is a block diagram illustrating the sequence of FIG. 7 in examples of the present disclosure.

In block 702-2, agent 114-4 creates a linked clone 802 on host 102-4 from full clone 304 on host 102-2 as illustrated in FIG. 8. As a result linked clone 802 has the virtual hardware specified in OVF descriptor 130 or another virtual hardware description file when an OVF package is not used, and a difference virtual machine disk 804 stored on datastore 118-4. Any data of linked clone 802 not found in difference virtual machine disk 804 would be read from virtual machine disk 306 on datastore 118-2 of host 102-2.

From the foregoing, it will be appreciated that various embodiments of the present disclosure have been described herein for purposes of illustration, and that various modifications may be made without departing from the scope and spirit of the present disclosure. For example, although system 100 is shown with a certain number of hosts, the principles of the present disclosure may be applied to a lesser or greater number of hosts. Accordingly, the various embodiments disclosed herein are not intended to be limiting, with the true scope and spirit being indicated by the following claims.

We claim:

1. A method for a virtual machine system to clone a parent virtual machine with a virtual machine disk on a datastore of a first host, comprising:
    creating an open virtualization format (OVF) package of the parent virtual machine, the OVF package including an OVF descriptor and a copy of the virtual machine disk;
    creating a metainfo file based on the OVF package and an address of a tracker;
    sending the metainfo file to the tracker;
    cloning the parent virtual machine to a second host, comprising:
        accessing the tracker to determine the first datastore has pieces of the OVF package;
        downloading at least some of the pieces of the OVF package from the first datastore to a second datastore of the second host;
        based on the metainfo file, assembling the OVF package on the second datastore from the downloaded pieces of the OVF package; and
        deploying a first full clone of the parent virtual machine on the second host based on the assembled OVF package; and
    cloning the parent virtual machine to a third host, comprising:
        accessing the tracker to determine the first datastore has the pieces of the OVF package and the second datastore has at least some of the pieces of the OVF package;
        downloading different pieces of the OVF package from the first and the second datastores to a third datastore of the third host;
        based on the metainfo file, assembling the OVF package on the third datastore from the downloaded pieces of the OVF package; and
        deploying a second full clone of the parent virtual machine on the third host based on the assembled OVF package.

2. The method of claim 1, further comprising uploading the metainfo file to the second and the third hosts, wherein cloning the parent virtual machine to the second and the third hosts each further comprises opening the metainfo file to access the tracker.

3. The method of claim 1, further comprising:
    cloning the parent virtual machine to a fourth host, comprising:
        accessing the tracker to determine the first data store has the pieces of the OVF package, and the second and the third datastores have at least some of the pieces of the OVF package;
        selecting datastores from the first, the second, and the third datastores;
        downloading different pieces of the OVF package from the selected datastores to a fourth datastore of the fourth host;
        based on the metainfo file, assembling the OVF package on the fourth datastore from the downloaded pieces of the OVF package; and
        deploying a third full clone of the parent virtual machine on the fourth host based on the assembled OVF package.

4. The method of claim 3, further comprising uploading the metainfo file to the second, the third, and the fourth hosts, wherein cloning the parent virtual machine to the second, the third, and the fourth hosts each further comprises opening the metainfo file to access the tracker.

5. The method of claim 3, wherein the selected datastores are chosen based on conditions of network connections from the first, the second, and the third datastores to the fourth datastore.

6. The method of claim 1, further comprising:
    creating a linked clone on a fourth host, comprising:
        selecting a datastore from the first, the second, and the third datastores; and
        creating the linked clone on the fourth host based on a full clone of the parent virtual machine on the selected datastore, the linked clone comprising a difference virtual machine disk on a fourth datastore of the fourth host that stores changes to the linked clone.

7. The method of claim 6, wherein the selected datastore is chosen based on conditions of network connections from the first, the second, and the third datastores to the fourth datastore.

8. The method of claim 1, wherein downloading the different pieces of the OVF package from the first and the second datastores to the third datastore of the third host occurs in parallel to downloading at least some of the pieces of the OVF package from the first datastore to the second datastore of the second host.

9. A virtual machine system, comprising:
a tracker for peer-to-peer (P2P) file sharing;
a first host, comprising:
  a first hypervisor;
  a first cloning agent; and
  a first datastore having a virtual machine disk of a parent virtual machine;
a second host, comprising:
  a second hypervisor;
  a second cloning agent; and
  a second datastore; and
a third host, comprising:
  a third hypervisor;
  a third cloning agent; and
  a third datastore;
wherein:
  the first cloning agent is to create a metainfo file based on pieces of the virtual machine disk and an address of the tracker, and send the metainfo file to the tracker;
  the second cloning agent is to:
    access the tracker to determine the first datastore has the pieces of the virtual machine disk;
    download at least some of the pieces of the virtual machine disk from the first datastore to the second datastore; and
    based on the metainfo file, assemble the virtual machine disk on the second datastore from the downloaded pieces of the virtual machine disk; and
    deploy a first full clone of the parent virtual machine on the second host based on the assembled virtual machine disk;
  the third cloning agent is to:
    access the tracker to determine the first datastore has the pieces of the virtual machine disk and the second datastore has at least some of the pieces of the virtual machine disk;
    download different pieces of the virtual machine disk from the first and the second datastores to the third datastore; and
    based on the metainfo file, assemble the virtual machine disk on the third datastore from the downloaded pieces of the virtual machine disk; and
    deploy a second full clone of the parent virtual machine on the third host based on the assembled virtual machine disk.

10. The system of claim 9, wherein the virtual machine disk and an open virtualization format (OVF) descriptor are part of an OVF package, and the first cloning agent is to create the OVF package and the metainfo file based on the OVF package.

11. The system of claim 9, wherein the first cloning agent is to upload the metainfo file to the second and the third hosts, and the second and the third hosts each accesses the tracker based on the metainfo file.

12. The system of claim 9, further comprising:
a fourth host, comprising:
  a fourth hypervisor;
  a fourth cloning agent; and
  a fourth datastore; and
wherein the fourth cloning agent is to:
  access the tracker to determine the first datastore has the pieces of the virtual machine disk, and the second and the third datastores have at least some of the pieces of the virtual machine disk;
  select datastores from the first, the second, and the third datastores;
  download different pieces of the virtual machine disk from the selected datastores to the fourth datastore;
  based on the metainfo file, assemble the virtual machine disk on the fourth datastore from the downloaded pieces of the virtual machine disk; and
  deploy a third full clone of the parent virtual machine on the fourth host based on the assembled virtual machine disk.

13. The system of claim 10, wherein the first cloning agent is to upload the metainfo file to the second, the third, and the fourth hosts, and the second, the third, and the fourth hosts each accesses the tracker based on the metainfo file.

14. The system of claim 10, wherein the fourth agent selects from the first, the second, and the third datastores based on conditions of network connections from the first, the second, and the third datastores to the fourth datastore.

15. The system of claim 9, further comprising:
a fourth host, comprising:
  a fourth hypervisor;
  a fourth cloning agent; and
  a fourth datastore; and
wherein the fourth cloning agent is to:
  select a datastore from the first, the second, and the third datastores; and
  create a linked clone on the fourth host based on a full clone of the parent virtual machine on the selected datastore, the linked clone comprising a difference virtual machine disk on the fourth datastore that stores changes to the linked clone.

16. The system of claim 15, wherein the fourth agent selects from the first, the second, and the third datastores based on conditions of network connections from the first, the second, and the third datastores to the fourth datastore.

17. The system of claim 9, wherein the third cloning agent downloading the different pieces of the virtual machine disk from the first and the second datastores to the third datastore occurs in parallel to the second cloning agent downloading at least some of the pieces of the virtual machine disk from the first datastore to the second datastore.

18. A non-transitory computer-readable storage medium encoded with instructions executable by a processor to perform a method for a virtual machine system to clone a parent virtual machine with a virtual machine disk on a datastore of a first host, the method comprising:
creating an open virtualization format (OVF) package of the parent virtual machine, the OVF package including an OVF descriptor and a copy of the virtual machine disk;
creating a metainfo file based on the OVF package and an address of a tracker;
sending the metainfo file to the tracker;
cloning the parent virtual machine to a second host, comprising:
  accessing the tracker to determine the first datastore has pieces of the OVF package;

downloading at least some of the pieces of the OVF package from the first datastore to a second datastore of the second host;

based on the metainfo file, assembling the OVF package on the second datastore from the downloaded pieces of the OVF package; and deploying a first full clone of the parent virtual machine on the second host based on the assembled OVF package; and cloning the parent virtual machine to a third host, comprising:

accessing the tracker to determine the first datastore has the pieces of the OVF package and the second datastore has at least some of the pieces of the OVF package;

downloading different pieces of the OVF package from the first and the second datastores to a third datastore of the third host;

based on the metainfo file, assembling the OVF package on the third datastore from the downloaded pieces of the OVF package; and deploying a second full clone of the parent virtual machine on the third host based on the assembled OVF package.

19. The non-transitory computer-readable storage medium of claim 18, the method further comprising:

cloning the parent virtual machine to a fourth host, comprising:

accessing the tracker to determine the first data store has the pieces of the OVF package, and the second and the third datastores have at least some of the pieces of the OVF package;

selecting datastores from the first, the second, and the third datastores;

downloading different pieces of the OVF package from the selected datastores to a fourth datastore of the fourth host;

based on the metainfo file, assembling the OVF package on the fourth datastore from the downloaded pieces of the OVF package; and deploying a third full clone of the parent virtual machine on the fourth host based on the assembled OVF package.

20. The non-transitory computer-readable storage medium of claim 18, the method further comprising:

creating a linked clone on a fourth host, comprising:

selecting a datastore from the first, the second, and the third datastores; and creating the linked clone on the fourth host based on a full clone of the parent virtual machine on the selected datastore, the linked clone comprising a difference virtual machine disk on a fourth datastore of the fourth host that stores changes to the linked clone.

* * * * *